United States Patent [19]

Parsonage

[11] Patent Number: 4,653,319

[45] Date of Patent: Mar. 31, 1987

[54] SPEED INDICATING MEANS

[75] Inventor: Peter C. J. Parsonage, Auckland, New Zealand

[73] Assignee: Development Finance Corporation of New Zealand, Auckland, New Zealand

[21] Appl. No.: 765,115

[22] Filed: Aug. 13, 1985

[30] Foreign Application Priority Data

Aug. 15, 1984 [NZ] New Zealand .......................... 209241

[51] Int. Cl.$^4$ ................................................ G01F 1/58
[52] U.S. Cl. .................................. 73/181; 73/861.13; 73/861.15
[58] Field of Search ................. 73/861.13, 861.15, 181

[56] References Cited

U.S. PATENT DOCUMENTS

| | | |
|---|---|---|
| 1,249,530 | 12/1917 | Smith et al. . |
| 3,119,960 | 1/1964 | Kenyon ................................... 73/181 |
| 3,885,433 | 5/1975 | Marsh . |
| 3,897,684 | 8/1975 | Dewan . |
| 3,903,741 | 9/1975 | Greene . |
| 4,290,312 | 9/1981 | Kobayashi . |

FOREIGN PATENT DOCUMENTS

| | | |
|---|---|---|
| 0069456 | 1/1983 | European Pat. Off. . |
| 1059291 | 2/1967 | United Kingdom . |
| 1204295 | 9/1970 | United Kingdom . |
| 1324632 | 7/1973 | United Kingdom . |
| 1432233 | 4/1976 | United Kingdom . |
| 2026700 | 2/1980 | United Kingdom . |

OTHER PUBLICATIONS

Gray et al., "Electromagnetic Differential Flowmeter" Mar. 1970.

Primary Examiner—Herbert Goldstein
Attorney, Agent, or Firm—Young & Thompson

[57] ABSTRACT

A Faraday transducer for a marine speed indicator is sealed in a cylindrical housing so that it can be mounted in a boat hull with its base flush with the hull. A horseshoe magnet sealed within the housing has its poles located against the base surface and with 4 electrodes in the base surface located one on each side of each magnetic pole. The electrodes are connected together in such a way as to cancel out stray magnetic fields and to increase the Faraday emf produced by the relative movement of water flowing across the base of the transducer.

5 Claims, 6 Drawing Figures

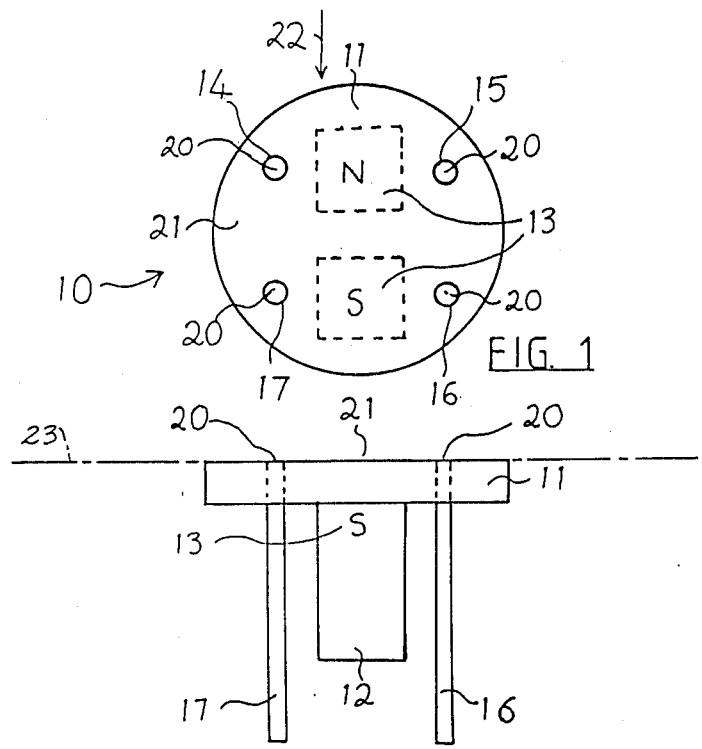
FIG. 1
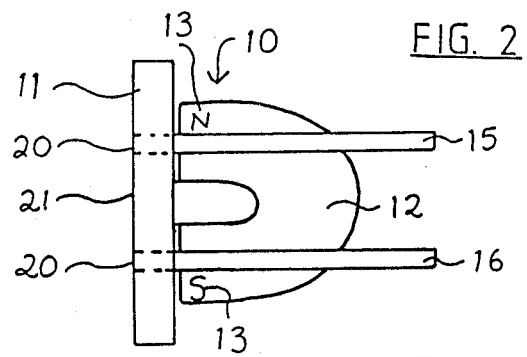
FIG. 2
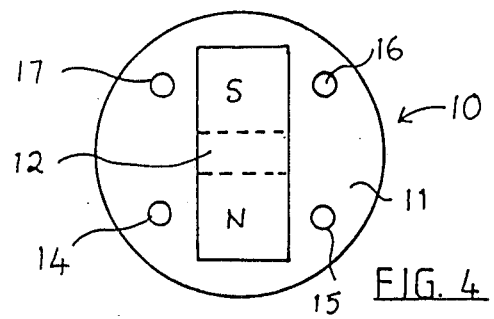
FIG. 3
FIG. 4

SPEED INDICATING MEANS

This invention relates to a speed indicator for marine use, and in particular a transducer for this purpose.

Speed measurement using the Faraday technique is well known. It involves using the flow of fluid through the lines of flux of a magnet to generate an emf proportional to the rate of fluid flow.

Examples include:
U.S. Pat. No. 3,903,741—Greene,
U.S. Pat. No. 3,885,433—Marsh,
U.S. Pat. No. 3,897,684—Dewan,
U.S. Pat. No. 1,249,530—Smith.

The early arrangement used by Smith required relatively large magnets and was not suitable for installation in small craft, as well as being expensive, and heavy. Later units have concentrated on the moving paddle arrangement of Greene. But both this and the Marsh unit require the probe to extend below the hull and thus are susceptible to damage.

There is a need for an improved marine speed indicator that can be mounted generally flush with the exterior of the hull. It is an object of the present invention to provide such an improved marine speed indicator.

In a first aspect, the present invention broadly consists in a speed indicating means comprising a surface along which liquid can flow, a magnet, the poles of which are located adjacent the surface, at least two electrodes in the surface, located in the vicinity of said poles, and a sensing means arranged to sense any electrical potential developed across any two of said electrodes.

Preferably, the sensing means includes an amplifier to amplify the electrical potential to enable it to be detected more readily.

Preferably, there are four said electrodes, one each side of each said magnetic pole.

Preferably, the electrodes are arranged in pairs, each pair being connected in series with the or each other pair, the sensing means being arranged to detect the total electrical potential developed across the pairs.

In a second aspect, the present invention broadly consists in a method of determining the speed of liquid flow past a reference point, the method comprising the steps of providing at the point a surface for the liquid to flow along, positioning a magnetic field to extend through the liquid adjacent said surface, and detecting an electrical potential between at least two locations in the surface in the vicinity of the magnetic field.

Preferably, the method of detecting the electrical potential comprises detecting the total potential developed across a plurality of pairs of locations connected in series.

Preferably, the method further comprises the step of amplifying the electrical potential before detecting it.

The above gives a broad description of the present invention, a preferred form of which will now be described by way of example with reference to the accompanying drawings in which:

FIG. 1 is a plan view of a transducer for a marine speed indicator of the present invention;

FIG. 2 is a side view of the transducer of FIG. 1;

FIG. 3 is an end view of the transducer of FIG. 1;

FIG. 4 is a view from beneath of the transducer of FIG. 1; and

Figure 5:
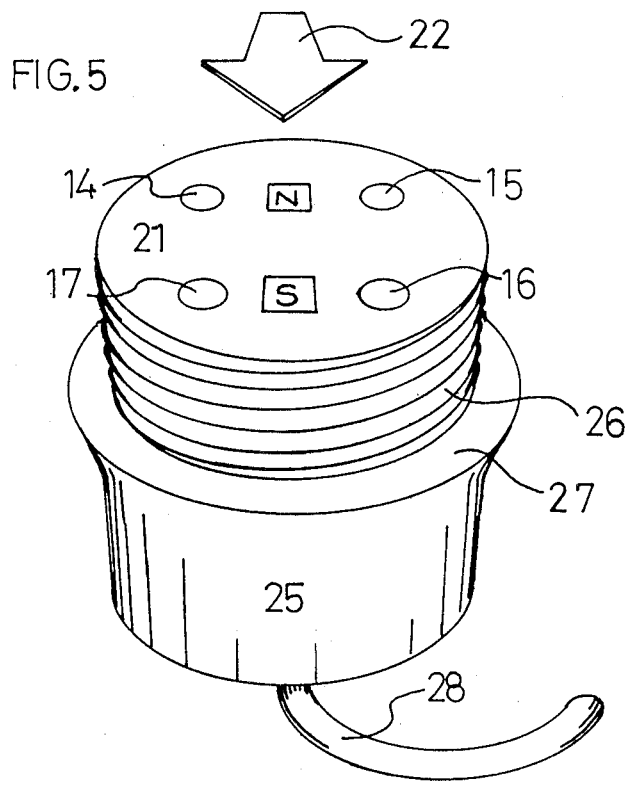
FIG. 5 is a perspective view of the assembled unit ready for installation in a boat hull.

Turning now to the drawings, there is shown a transducer 10 for a marine speed indicator comprising a base board 11 behind which is located a horseshoe magnet 12. The board typically comprises a sheet of epoxy material of the order of a millimeter in thickness, so as not to interfere with the magnetic field of the magnet. The poles 13 of the magnet are located against the board.

Positioned around the magnet are four electrodes 14, 15, 16 and 17 the ends 20 of which are exposed to the outer surface 21 of the board. These electrodes are preferably formed of copper, the outer ends of which are polished flush with the acrylic surface. The indicator is conveniently sealed in a generally cylindrical housing 25 having a threaded portion 26 of reduced diameter extending from a circumferential flange 27. A coaxial cable 28 extends from the rear of housing for connection to the speed measuring circuitry.

In use, water flows along the surface 21 of the base board, in the direction indicated by the arrow 22, passing through the magnetic field of the magnet 12. Because water is a conductor of electricity, and because a conductor moving through a magnetic field will have an electrical potential, or emf, induced in it, an electrical potential gradient will appear across the surface 21. A glavanometer connected across two of the electrodes, therefore, may register an emf proportional to the speed at which the conductor (water) is moving.

As indicated diagrammatically in FIG. 2, the transducer is mounted in a boat hull 23 with its base surface 21 substantially flush with the hull.

Figure 6:
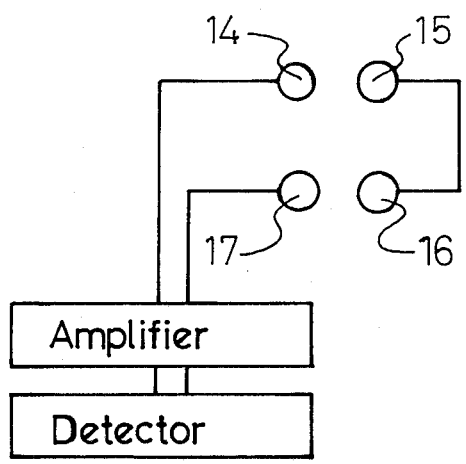
FIG. 6 shows the connections of the electrodes.

However, the electrical potential is typically fairly small, and generally is not sufficient to register on a meter. The four electrodes illustrated are arranged as two pairs of electrodes connected in series, so that double the emf is provided to be measured. In other words, electrodes 15 and 16 are connected to each other, and a measuring device is connected across electrodes 14 and 17, as shown in FIG. 6.

Any number of pairs of electrodes could be connected in series in this fashion to provide an emf sufficient to be registered on a measuring device.

The measuring device includes an electronic circuit arranged to amplify the signal before it is measured, or to detect the signal directly and give an analogue or digital output signal corresponding to the emf detected by the circuit.

The current generated by the transducer shown will be very small, and will not threaten to wear out any electrical or electronic componentry.

Stray voltage fields may be present in the water from time to time. However, the arrangement of conductors around the magnet as illustrated, and described above, will cancel the effect of stray fields across the pole faces, and will short circuit them in the direction parallel to the pole faces.

The transducer can be located in the hull of a boat or ship, with the surface 21 coplanar with the hull surface. The housing 25 can be inserted in a threaded aperture in the hull and its position adjusted by rotation until the magnetic poles 13 are aligned with the intended water flow direction 22. The housing can then be secured in place by any convenient means eg a lock-nut on the thread portion 26. Thus the transducer does not protrude from the hull unlike the prior art probes. The speed of water movement across the transducer will therefore correspond to the speed of the vessel through the water.

Alternatively, the transducer may be located in a fixture in a river or other body of flowing water to give an indication of actual water flow.

Many other applications of the invention are also possible.

The invention provides a means of indicating water speed without the use of any moving parts, and which is not subject to fouling. It is easy to keep clean (a mere wipe will generally be sufficient if cleaning is ever necessary).

Various modifications may be made to the invention as described above without departing from the scope of the present invention as broadly defined or envisaged. For example, different configurations of magnets may be used, including permanent bar magnets, and electromagnets. The invention may be used with liquids other than water, as long as they are able to conduct electricity.

I claim:

1. A marine speed transducer for mounting in a boat hull, said transducer including a housing having a planar surface along which liquid can flow; a magnet having two poles both of which are located adjacent the plane of said surface; at least four electrodes in said surface, at least two said electrodes being disposed on each side of one imaginary axis that passes through both said poles; two said electrodes being connected together, another two said electrodes being connectable to a detector circuit.

2. A transducer as claimed in claim 1, all the said electrodes on one side of said imaginary axis being connected together, two of said electrodes on the other side of said imaginary axis being connectable to a detector circuit.

3. A transducer as claimed in claim 1, there being four said electrodes disposed two on each side of said axis.

4. A transducer as claimed in claim 1, said housing being cylindrical and said planar surface along which said liquid can flow being a base of said cylinder.

5. A transducer as claimed in claim 1, mounted in a boat hull with said planar surface substantially flush with the hull, the output from the transducer being connected to an amplifier.

* * * * *